(12) United States Patent
Bryant et al.

(10) Patent No.: US 8,099,936 B2
(45) Date of Patent: Jan. 24, 2012

(54) ELECTRICALLY POWERED FLAIL MOWER

(75) Inventors: Christian Stanton Carver Bryant, Charlotte, NC (US); Scott Chartrand, Charlotte, NC (US); Carlos A. Bellot, Charlotte, NC (US); Harry L. Derby, V, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 12/360,148

(22) Filed: Jan. 27, 2009

(65) Prior Publication Data
US 2010/0186361 A1 Jul. 29, 2010

(51) Int. Cl.
*A01D 34/52* (2006.01)
*A01D 34/53* (2006.01)

(52) U.S. Cl. ............................ 56/294; 56/295; 241/194

(58) Field of Classification Search .................. 56/294, 56/249, 12.9, 251, 252, DIG. 8, 504, 11.9, 56/295; 172/109, 22, 321, 21; 318/432, 318/139, 140, 41, 376; 701/22; 180/65.1, 180/65.8; 241/194
See application file for complete search history.

(56) References Cited

U.S. PATENT DOCUMENTS

| | | | | |
|---|---|---|---|---|
| 2,711,067 A | * | 6/1955 | Mott | 56/289 |
| 3,043,080 A | * | 7/1962 | Mott | 56/294 |
| 3,122,871 A | * | 3/1964 | Brilts et al. | 56/294 |
| 3,177,640 A | * | 4/1965 | Mott, Jr. | 56/294 |
| 3,400,527 A | * | 9/1968 | Woodring | 56/294 |
| 3,417,557 A | * | 12/1968 | Brewer | 56/294 |
| 3,505,800 A | * | 4/1970 | McCanse | 56/294 |
| 3,527,038 A | * | 9/1970 | Wood et al. | 56/294 |
| 3,594,994 A | * | 7/1971 | Engler | 56/307 |
| 3,608,842 A | * | 9/1971 | Engler | 241/194 |
| 3,633,349 A | * | 1/1972 | Mathews | 56/294 |
| 3,645,076 A | * | 2/1972 | Aldred | 56/294 |
| 3,657,869 A | * | 4/1972 | Ayranto | 56/294 |
| 3,678,671 A | * | 7/1972 | Scarnato et al. | 56/505 |
| 3,693,335 A | * | 9/1972 | Mathews | 56/294 |
| 3,831,357 A | * | 8/1974 | Mathews | 56/294 |
| 3,831,359 A | * | 8/1974 | Mathews | 56/294 |
| 3,977,165 A | * | 8/1976 | Klinner et al. | 56/16.4 R |
| 4,241,568 A | * | 12/1980 | Mathews | 56/294 |
| 4,631,910 A | * | 12/1986 | Doyen et al. | 56/505 |
| 4,873,818 A | * | 10/1989 | Turner | 56/10.8 |
| 5,485,718 A | * | 1/1996 | Dallman | 56/294 |

(Continued)

FOREIGN PATENT DOCUMENTS

JP 10033037 A * 2/1998

*Primary Examiner* — Arpad Fabian-Kovacs
(74) *Attorney, Agent, or Firm* — Harness, Dickey & Pierce, P.L.C.

(57) ABSTRACT

A flail mower assembly includes a deck having a shaft rotatably connected to the deck. A flail drum is connected to the shaft and is co-rotatable with the shaft. A plurality of flail blade assemblies is independently rotatably connected to the flail drum to provide two degrees of freedom-of-rotation of each of the plurality of flail blade assemblies independent of a direction of drum rotation. First and/or second electric motors are connected to the deck and rotatably connected to the shaft. The shaft is rotated by an energized one of the first or second electric motors or both energized simultaneously. A load connected to the first and second electric motors when the first and second electric motors are de-energized reduces a rotational velocity of the flail drum.

26 Claims, 5 Drawing Sheets

U.S. PATENT DOCUMENTS

| | | | | |
|---|---|---|---|---|
| 5,570,571 A * | 11/1996 | Dallman | | 56/249.5 |
| 5,666,794 A * | 9/1997 | Vought et al. | | 56/15.2 |
| 5,733,385 A * | 3/1998 | Dallman | | 148/194 |
| 6,000,205 A * | 12/1999 | Joray | | 56/294 |
| 6,082,082 A | 7/2000 | Hunter et al. | | |
| 6,253,534 B1 | 7/2001 | Hunter et al. | | |
| 6,522,960 B2 * | 2/2003 | Nada | | 701/22 |
| 6,607,039 B2 * | 8/2003 | Simon | | 172/22 |
| 6,658,830 B2 * | 12/2003 | Wetzel | | 56/12.9 |
| 6,734,647 B2 * | 5/2004 | Wakitani et al. | | 318/432 |
| 6,946,762 B2 | 9/2005 | Rinholm et al. | | |
| 7,487,842 B2 * | 2/2009 | Classen et al. | | 172/22 |
| 7,562,516 B2 * | 7/2009 | Witty | | 56/249 |
| 7,610,975 B1 * | 11/2009 | Gust et al. | | 180/65.245 |
| 2002/0053479 A1 * | 5/2002 | Wakitani et al. | | 180/315 |
| 2003/0081632 A1 * | 5/2003 | Kielhofer et al. | | 370/473 |
| 2004/0238239 A1 * | 12/2004 | Wakitani et al. | | 180/6.5 |
| 2004/0244350 A1 * | 12/2004 | Schafer | | 56/249 |
| 2006/0053761 A1 * | 3/2006 | Lougheed et al. | | 56/15.8 |
| 2008/0029278 A1 * | 2/2008 | Wynings | | 172/22 |
| 2009/0014189 A1 * | 1/2009 | Stanley et al. | | 172/109 |
| 2009/0050341 A1 * | 2/2009 | Hathaway et al. | | 172/321 |
| 2009/0065273 A1 * | 3/2009 | Wyatt et al. | | 180/65.8 |
| 2009/0069964 A1 * | 3/2009 | Wyatt et al. | | 701/22 |

* cited by examiner

ELECTRICALLY POWERED FLAIL MOWER

FIELD

The present disclosure relates to flail cutting systems used on grass or brush cutting machines.

BACKGROUND

This section provides background information related to the present disclosure which is not necessarily prior art.

Flail cutting systems are known having cutting blades which are rotated in a single cutting direction and which allow a single degree of freedom-of-rotation for the individual cutting blades. Flail cutting systems are commonly used in rough-cut applications such as heavy brush, or tall non-frequently cut grass or hay. For these reasons, flail cutting systems are commonly adapted to operate over rough, uneven terrain that commonly includes roots, small stumps, or small stones. Flail blades are commonly gang-mounted to a drum and may also include additional rotational mounting of the blades such that if a blade strikes a dense object or stone, the blade can reverse rotate opposite to the rotational arc of the drum to allow the flail blade to deflect to prevent damage to the blade. Mechanical and hydraulic drive systems are known which provide the necessary power to cut dense vegetation as well as to generate the startup torque required to initiate rotation of the large quantity of flail blades and supporting drum.

One of the disadvantages of mechanically or hydraulically driving a flail is the necessity of a powerful drive system to overcome start-up torque. The mechanical/hydraulic drive must be able to handle the large initial load put on the drive while trying to rotate the flail shaft from a dead stop. This start-up requirement necessarily dictates that the drive will be oversized and will therefore operate inefficiently during regular operation which is the preponderance of the duty cycle.

SUMMARY

This section provides a general summary of the disclosure, and is not a comprehensive disclosure of its full scope or all of its features.

According to several embodiments, a flail mower assembly includes a deck having opposed walls. A shaft is rotatably connected to the opposed walls. A flail drum is connected to the shaft and is co-rotatable with the shaft. A plurality of flail blade assemblies is independently rotatably connected to the flail drum to provide two degrees of freedom-of-rotation of each of the plurality of flail blade assemblies independent of a direction of drum rotation. First and second electric motors are connected to the deck and rotatably connected to the shaft. The shaft is rotated by an energized one of the first or second electric motors or both energized simultaneously.

According to other embodiments, a flail mower assembly includes a deck having opposed walls. A shaft is rotatably connected to the opposed walls. A flail drum is connected to the shaft and is co-rotatable with the shaft. A plurality of flail blade assemblies is independently rotatably connected to the flail drum to provide two degrees of freedom-of-rotation of each of the plurality of flail blade assemblies independent of a direction of drum rotation. First and second electric motors are connected to the deck and rotatably connected to the shaft. The shaft is rotated by an energized one of the first or second electric motors or both energized simultaneously. A load connected to the first and second electric motors when the first and second electric motors are de-energized reduces a rotational velocity of the flail drum.

According to still other embodiments, a drive assembly connecting each of the first and second electric motors to the shaft is adapted to one of reduce or increase a rotational speed of any energized ones of the first and second electric motors.

According to additional embodiments, a method for operating a flail mower assembly having a deck with opposed walls, a shaft rotatably connected to the opposed walls, and a flail drum connected to the shaft and co-rotatable with the shaft comprises: independently rotatably connecting a plurality of flail blade assemblies to the flail drum to provide two degrees of freedom-of-rotation of each of the plurality of flail blade assemblies independent of a direction of drum rotation; operating a first device to energize one of the first or second electric motors or both of the first and second electric motors simultaneously to co-rotate the shaft and the drum; and actuating a second device to select between a first direction of rotation of the shaft and a second direction of rotation of the shaft opposite to the first direction of rotation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
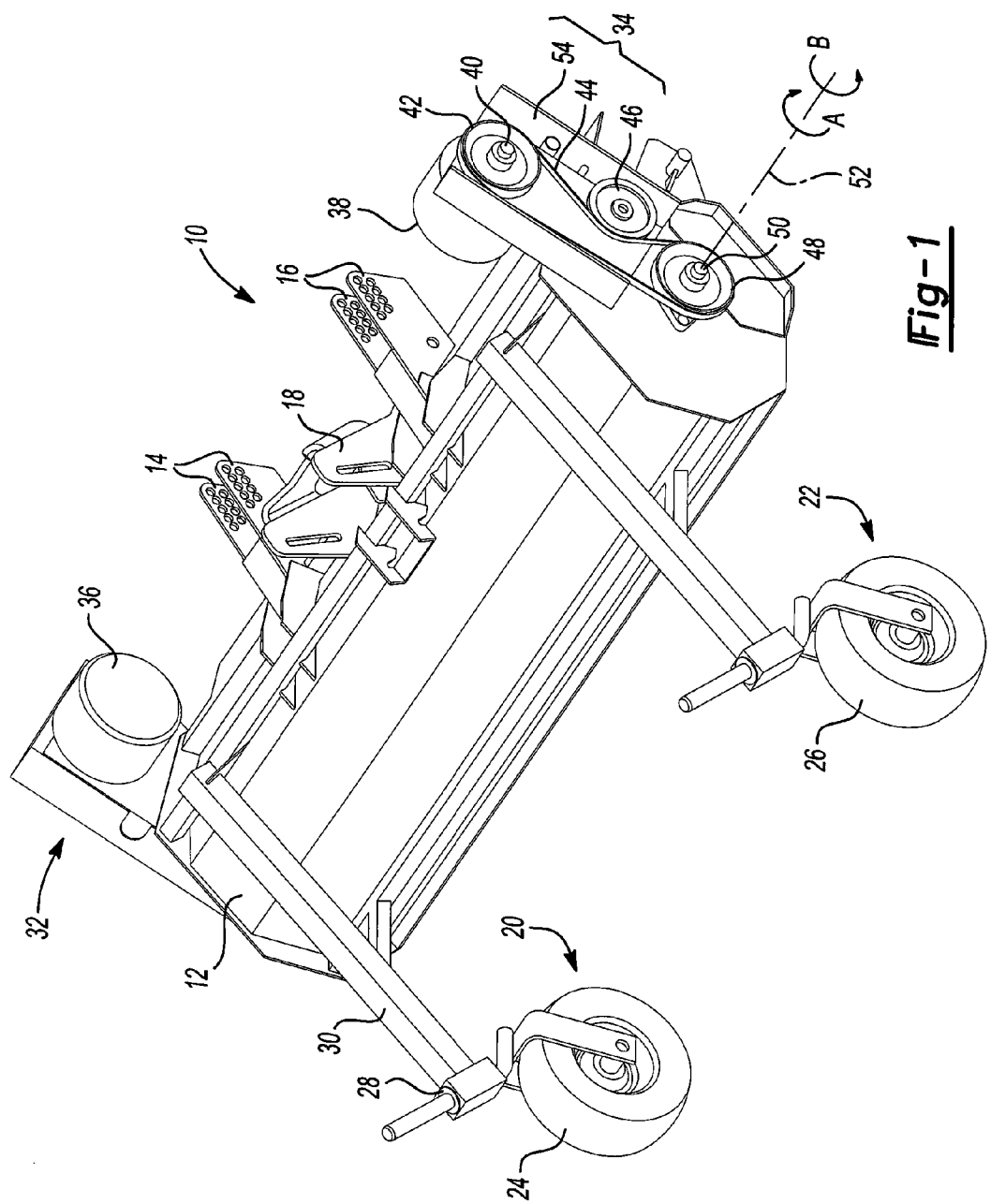
FIG. 1 is a top perspective view of a flail mower assembly of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring now to FIG. 1, a flail mower assembly 10 includes a flail deck 12 which can be supported to a drive component (not shown) such as a lawn tractor or similar device, using each of a first set of connection brackets 14 and a second set of connection brackets 16. A support/lift bracket assembly 18 can also be provided to raise and lower flail deck 12 and/or to help control a height of cut. Flail deck 12 is supported and movable along a ground surface using a first wheel assembly 20 and a second wheel assembly 22. A first and second wheel 24, 26 are provided with first and second wheel assemblies 20, 22 respectively. Additional components of the first and second wheel assemblies 20, 22 further include a height adjuster 28 and a support arm 30 which is fixedly connected to flail deck 12.

Power to rotate the flails of flail deck 12 is provided according to several embodiments using a first drive assembly 32 and an opposed second drive assembly 34. Each of the first and second drive assemblies 32, 34 includes an electric motor identified as first electric motor 36 and second electric motor 38 to provide rotational driving force. Second drive assembly 34 will be described in further detail. The components of first drive assembly 32 are similar to second drive assembly 34 and will therefore not be further discussed.

Second drive assembly 34 includes a motor shaft 40 extending from second electric motor 38 which is connected for rotation to a drive member 42 such as a transfer mechanism or drive pulley. Drive member 42 frictionally engages a power transfer device 44 such as a flexible V-belt or chain. A drive tension of power transfer device 44 can be adjusted using an intermediate member 46 such as a transfer mechanism or an idler pulley, and drive power from power transfer device 44 is delivered to a driven member 48 such as a transfer mechanism or a pulley. Driven member 48 is connected for example using a fastener or key assembly to a flail shaft 50. Flail shaft 50 rotates about a longitudinal axis of rotation 52 and can be rotated in either of a first drum rotation direction "A" or a second drum rotation direction "B" by controlling the direction of rotation of second electric motor 38. A housing 54 made for example from metal sheet provides a protective cover for the components including the drive member 42, power transfer device 44, intermediate member 46, and driven member 48.

According to additional embodiments, power to rotate the flails of flail deck 12 can be provided using only one of the first drive assembly 32 or the opposed second drive assembly 34. Accordingly, in these embodiments, only one of the first electric motor 36 or the second electric motor 38 is provided to create the shaft rotational driving force. Items associated with the eliminated electric motor are therefore also omitted, including the additional drive member, intermediate member, driven member, power transfer device, and housing, in addition to any electrical connection or control equipment associated with the omitted electric motor.

Figure 2:
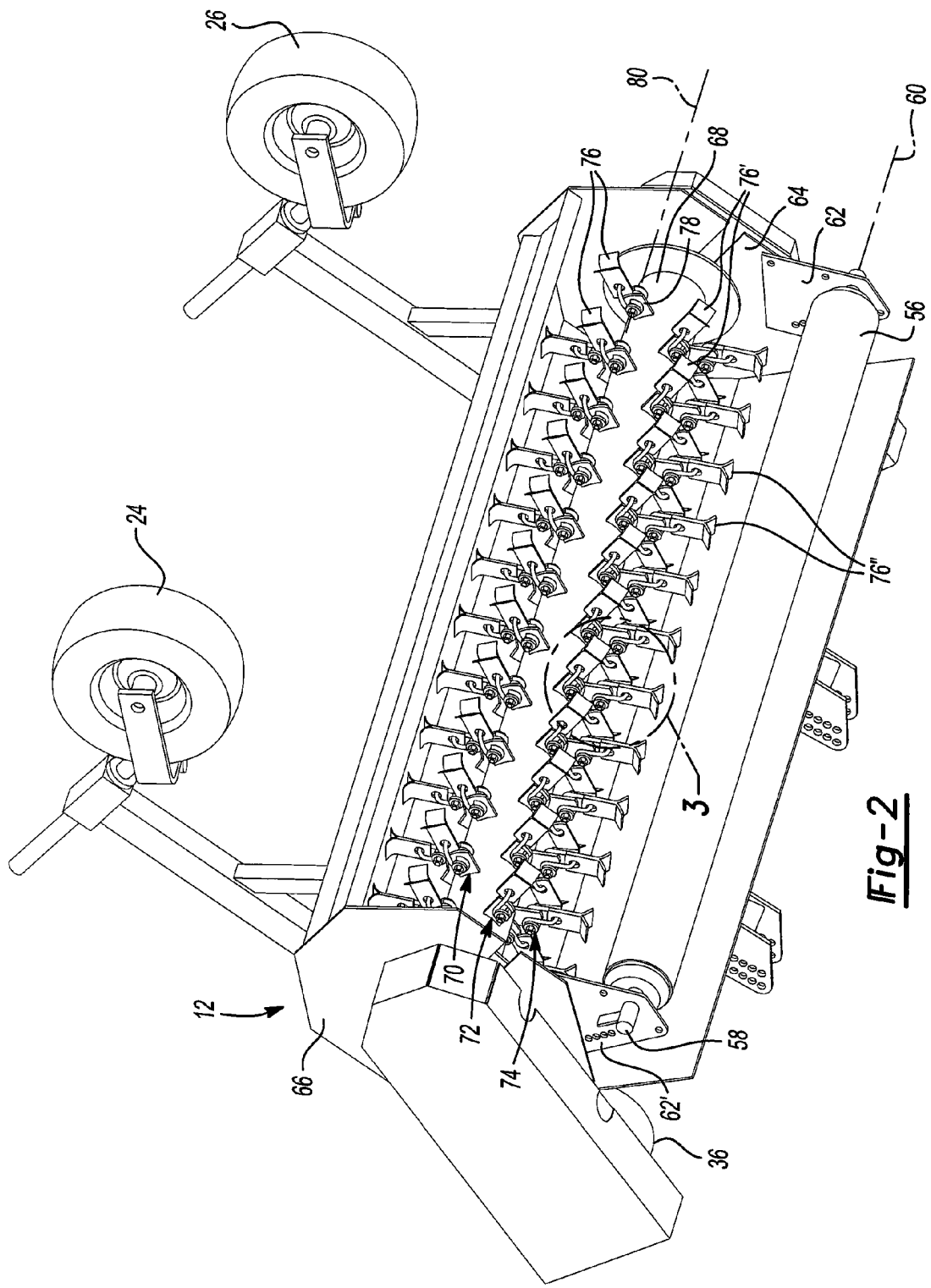
FIG. 2 is a bottom perspective view of the flail mower assembly of FIG. 1.

Referring to FIG. 2 and again to FIG. 1, flail deck 12 further provides a ground roller 56 which defines a metal tube adapted for axial rotation about a roller shaft 58 which rotates about a longitudinal roller axis of rotation 60. Roller shaft 58 and ground roller 56 are together supported using a roller mount bracket 62, 62' at opposed ends of roller shaft 58 which are fixedly connected to first and second housing end walls 64, 66 of flail deck 12. A flail drum 68 is also supported within flail deck 12 which is rotatably connected to first and second housing end walls 64, 66. Flail drum 68 is connected for co-rotation with flail shaft 50. At least a first, second, and third flail row 70, 72, 74 each include a plurality of flail blade assemblies 76. The rows 70, 72, 74 of flail blade assemblies 76 are mounted to flail drum 68. Each of the rows 70, 72, 74 of flail blade assemblies 76 are equidistantly spaced about a perimeter of flail drum 68. According to additional embodiments, each of the rows 70, 72, 74 of flail blade assemblies 76 can be parallel having collinear flail blade assemblies 76 in each row, or the flail blade assemblies can form a curved or angular geometric shape as they longitudinally extend along the flail drum 68.

Each flail blade assembly 76 is rotatably connected to an individual mounting plate 78 which is fixed to flail drum 68, for example by welding. Each of the flail blade assemblies 76 of a given flail row are coaxially aligned for rotation with respect to flail drum 68 about mounting plates 78, defining a flail axis of rotation 80 for each flail row. Each of the individual mounting plates 78 therefore co-rotate with flail drum 68 rotation, while permitting each of the flail blade assemblies 76 to co-rotate with the flail drum 68. Also, if any of the individual flail blade assemblies 76 strikes a dense or solid object such as a stone, the flail blade assembly 76 can deflect in a direction opposite to the direction of rotation of flail drum 68. This feature reduces the potential for damage to individual flail blade assemblies 76.

Flail drum 68 is rotatable using either one or the only provided one of the first or second electric motors 36, 38 independently or solely energized, or both first and second electric motors 36, 38 simultaneously energized. In direct contrast, ground roller 56 and each of first and second wheels 24, 26 are connected for passive rotation by contact with a ground surface, and are not powered for rotation similar to flail drum 68. Rotation of flail drum 68 is therefore independent of any motion of flail deck 12 and a velocity of rotation of flail drum 68 can be increased or decreased by varying the power to first and/or second electric motors 36, 38 even with flail deck 12 in a motionless state.

Figure 3:
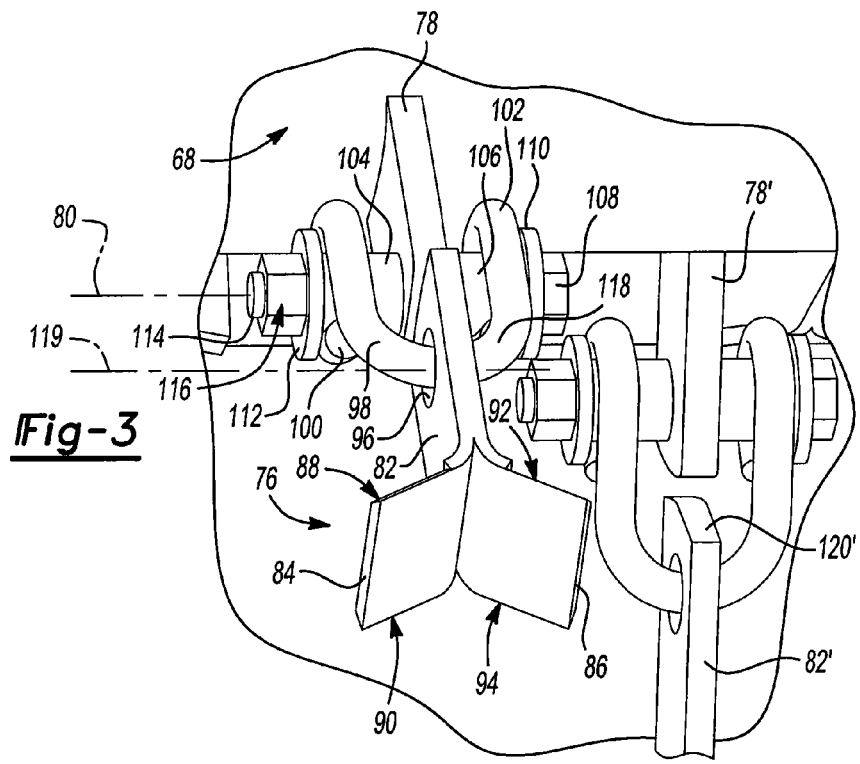
FIG. 3 is a front elevational perspective view taken at area 3 of FIG. 2.

Referring to FIG. 3, the assembly of an exemplary flail blade assembly 76 is shown in greater detail. As previously noted, mounting plate 78 is fixed to flail drum 68 and extends radially outward from flail drum 68. Each flail blade assembly 76 includes a flail blade body 82 which can be generally rectangular in shape and which bifurcates at a free end to create each of a first cutting blade 84 and a second cutting blade 86. A first cutting edge 88 and a second cutting edge 90 are oppositely positioned on first cutting blade 84 and, similarly, a third cutting edge 92 and a fourth cutting edge 94 are oppositely positioned on second cutting blade 86. The opposed positioning of first cutting edge 88 and third cutting edge 92 with respect to second cutting edge 90 and fourth cutting edge 94 allow cutting action when flail blade assembly 76 is rotated in conjunction with flail drum 68 in either first or second drum rotation direction "A" or "B". A mounting aperture 96 is also created in flail body 82 which is sized larger than a diameter of a U-shaped shackle 98 which is slidably disposed therethrough.

U-shaped shackle 98 can include a first looped end 100 and a second looped end 102 each partially encompassing an individual one of a first mounting shaft 104 or a second mounting shaft 106 respectively. First and second mounting shafts 104, 106 are hollow and tubular in shape, are both connected at a first end to mounting plate 78, and extend transversely to mounting plate 78 on opposite sides of the mounting plate 78. Each of the first and second mounting shafts 104, 106 as well as mounting plate 78 have a commonly created through-bore which is adapted to receive a fastener 108 such as a bolt. Fastener 108 is slidably received through a first washer 110 which is positioned in contact with second mounting shaft 106. Fastener 108 then further passes through second mounting shaft 104 and a second washer 112. A threaded shank 114 of fastener 108 extends outwardly from second washer 112 and receives a nut 116.

The lengths of first and second mounting shafts 104, 106 and therefore the position of first and second washers 110, 112 are predetermined to act as limits to horizontal motion of U-shaped shackle 98 in a direction coaxial to flail axis of rotation 80 extending through fastener 108. This mounting configuration allows rotation of U-shaped shackle 98 with respect to first and second mounting shafts 104, 106, while at the same time permitting independent rotation of flail body 82 at its support point to a shackle loop 118 of U-shaped shackle 98 at mounting aperture 96. This provides multiple degrees of freedom-of-rotation for each flail blade assembly 76 with respect to flail drum 68. A flail body end 120 can be rounded to minimize points of contact with mounting plate 78, which further provides for an increased angular degree of rotation for flail body 82 about shackle loop 118.

Referring again to both FIGS. 1 and 2, operation of flail mower assembly 10 can be as follows. When initially starting rotation of flail drum 68 from a dead stop the mass of flail drum 68 as well as the plurality of flail blade assemblies 76 can be accommodated by energizing the single electric motor (36 or 38), energizing a first one of either of the first or second electric motors 36, or 38, or simultaneously energizing both first and second electric motors 36, 38. For embodiments having both first and second electric motors 36, 38, after a predetermined period of time $T_1$ when flail drum 68 has reached a desired rate or value of revolutions per minute (RPM), one of the two electric motors 36, 38 can be de-energized to reduce the overall power consumption of flail mower assembly 10. During normal cutting operations using flail mower assembly 10 only one of the first or second electric motors 36, 38 (when both are provided) needs to be operational. If additional cutting power is desired by the operator such as when heavy, dense, and/or wet conditions are encountered, the operator can manually elect to energize the second non-operating one of the electric motors 36, 38 for any desired length of time.

The use of only one of or of both first and second electric motors 36, 38 to power flail mower assembly 10 also permits a nominal rotating speed for the operating electric motor through the use of rotational speed detection equipment. This permits the operator to select the operating speed of the electric motor(s) which through experience provides an optimum quality of cut desired. Also, at any time during operation of flail mower assembly 10, the operator can also elect to change the rotating direction of the operating electric motor(s) 36, 38.

Figure 4:
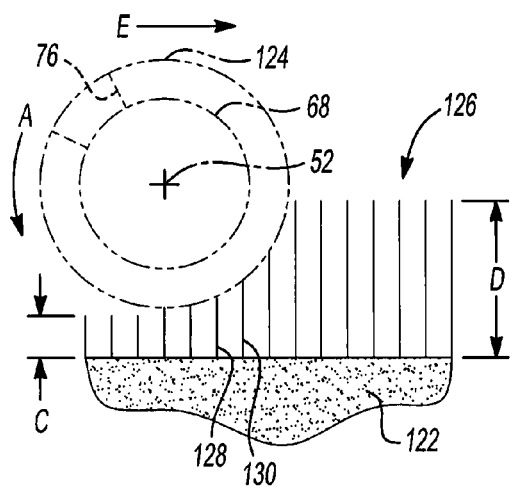
FIG. 4 is a partial cross sectional side elevational view of a flail assembly operating in a fine cut rotational direction.

Referring to FIG. 4, the capability to select opposite directions of rotation of the one electric motor or of the first and second electric motors 36, 38 also provides the operator with the option to select between a rough cut and a fine cut depending on the rotational direction chosen. The first drum rotation direction "A" depicted in FIG. 4 provides a fine cut capability. As the flail mower assembly 10 traverses over a ground surface 122, a cutting arc 124 defined by first and second cutting blades 84, 86 encounters each of a plurality of grass blades 126. The cutting arc 124 clips the grass blades 126 to a desired cutting height "C" from a starting height "D" when moved in a mower travel direction "E" and when flail drum 68 is rotated in the first drum rotation direction "A". The cutting arc 124 sequentially cuts individual ones of successive grass blades 128, 130 and provides multiple passes of the individual flail blade assemblies 76 over any one of the plurality of grass blades 126. The mower travel direction "E" and first drum rotation direction "A" also result in deflection of individual ones of the plurality of grass blades 126 in the mower travel direction "E". This deflection causes the grass blades 126 to deflect back toward the cutting arc 124 which therefore cuts fractional lengths of each grass blade per rotation providing a "fine cut" defined as having substantially all of the grass blades cut to the desired cutting height "C".

Figure 5:
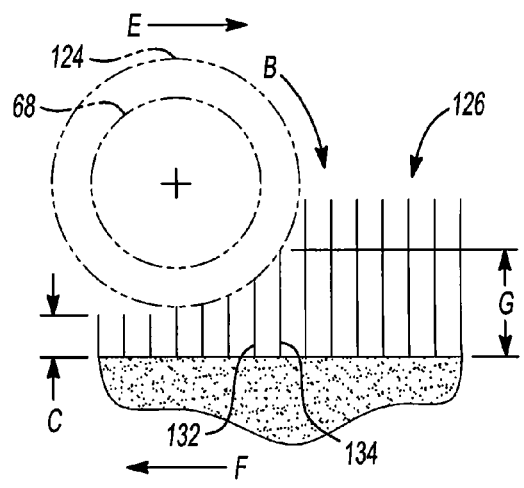
FIG. 5 is a partial cross sectional side elevational view of a flail assembly operating in a rough cut rotational direction.

Referring to FIG. 5, if flail mower assembly 10 is moved in the mower travel direction "E" but the second drum rotation direction "B" is selected, a rougher cut of the individual grass blades 126 will occur. As the cutting arc 124 traverses between successive grass blades 126 the grass blades 126 are bent or deflected in a grass deflection direction "F" which is opposite to the mower travel direction "E". This tends to pull individual ones of the grass blades 126 identified as grass blades 132, 134, into the flail blade assemblies 76 which chop the grass blades 126 roughly and at different heights instead of providing the "fine cut" which as noted above results in substantially all of the grass blades cut to the desired cutting height "C". The rough cut operation of flail drum 68 can be used for example to achieve an initial cut height "G" in thick or heavy brush. Some of the grass blades will be cut at initial cut height "G" and some may be cut at the desired cutting height "C" or at differing lengths in-between, thereby providing different grass blade cut heights or lengths, defining the "rough cut" grass blade finish. The operator can subsequently reverse direction of rotation of flail drum 68 to the first drum rotation direction "A" as shown in FIG. 4 and return to the same area for a second cut to achieve the desired cutting height "C". The capability to reverse the rotating direction of the single electric motor or the first and second electric motors 36, 38 provides the operator with the option to locally change the type of cut achieved and to use multiple passes to create a fine cut if desired, without requiring the operator to return to a shop area remote from the cutting area to modify the system to allow for the reverse rotation of cut.

Referring again to FIGS. 1 and 3, the use of U-shaped shackle 98 permits the flail blade assemblies 76 to rotate through an arc of rotation that permits the flail blade assemblies 76 to deflect opposite to rotation of flail drum 68 in either the first or second drum rotation direction "A" or "B". U-shaped shackle 98 provides two degrees of freedom-of-rotation for each flail blade assembly 76. A first degree of freedom-of-rotation is provided by rotation of first and second looped ends 100, 102 about first and second mounting shafts 104, 106 with respect to flail axis of rotation 80 defined by fastener 108. A second degree of freedom-of-rotation is provided by rotation of flail body 82 about shackle loop 118 about an axis of rotation 119 defined by shackle loop 118 passing through mounting aperture 96. This dual flail blade deflection capability and the use of opposed cutting edges (88/90, 92/94) both enhance the benefits of using reversible electric motors to power flail drum 68.

Referring again to FIG. 1, the drive equipment provided by first and second drive assemblies 32, 34 can also be reduced or substantially eliminated by directly connected first and/or second electric motors 36, 38. According to several embodiments the individually provided one of or both the first and second electric motors 36, 38 can be directly coupled to flail shaft 50 thereby eliminating drive member 42, power transfer device 44, intermediate member 46, and driven member 48. The rotational speed of the first and second electric motors 36, 38 can in these embodiments be controlled by the operator to achieve the desired quality of cut.

The use of electric motors such as first and second electric motors 36, 38 also permits regenerative braking of the flail drum 68 for rapid speed reduction of the flail drum 68. Regenerative braking is provided by the electric motor acting as a generator when the motor is connected to a load such as one or more batteries (not shown) or other energy storage devices provided with the mower or tractor assembly. During regenerative braking the electrical load on the motor due to its connection to the load path provides a braking affect that slows the flail drum 68 when the first and/or second electric motor 36, 38 is de-energized. The spinning flail 68 acts as the "engine" turning the generator (electric motor 36 or 38). As electrical energy flows to the load, mechanical load is placed on the flail shaft 68 causing it to slow. The regenerative braking affect can reduce or eliminate the need for a clutch or breaking device commonly used for flail mower assemblies known in the art which are propelled for example by hydraulic or transmission drive systems which do not provide a similar braking affect.

First and second electric motors 36, 38 can also be "selectively engageable". In the present context, selectively engageable refers to adapting one or both of the electric motors to be physically connected and/or disconnected as the cutting load varies. This can be accomplished by a mechanical or electro-mechanical clutch system (not shown).

Figure 6:
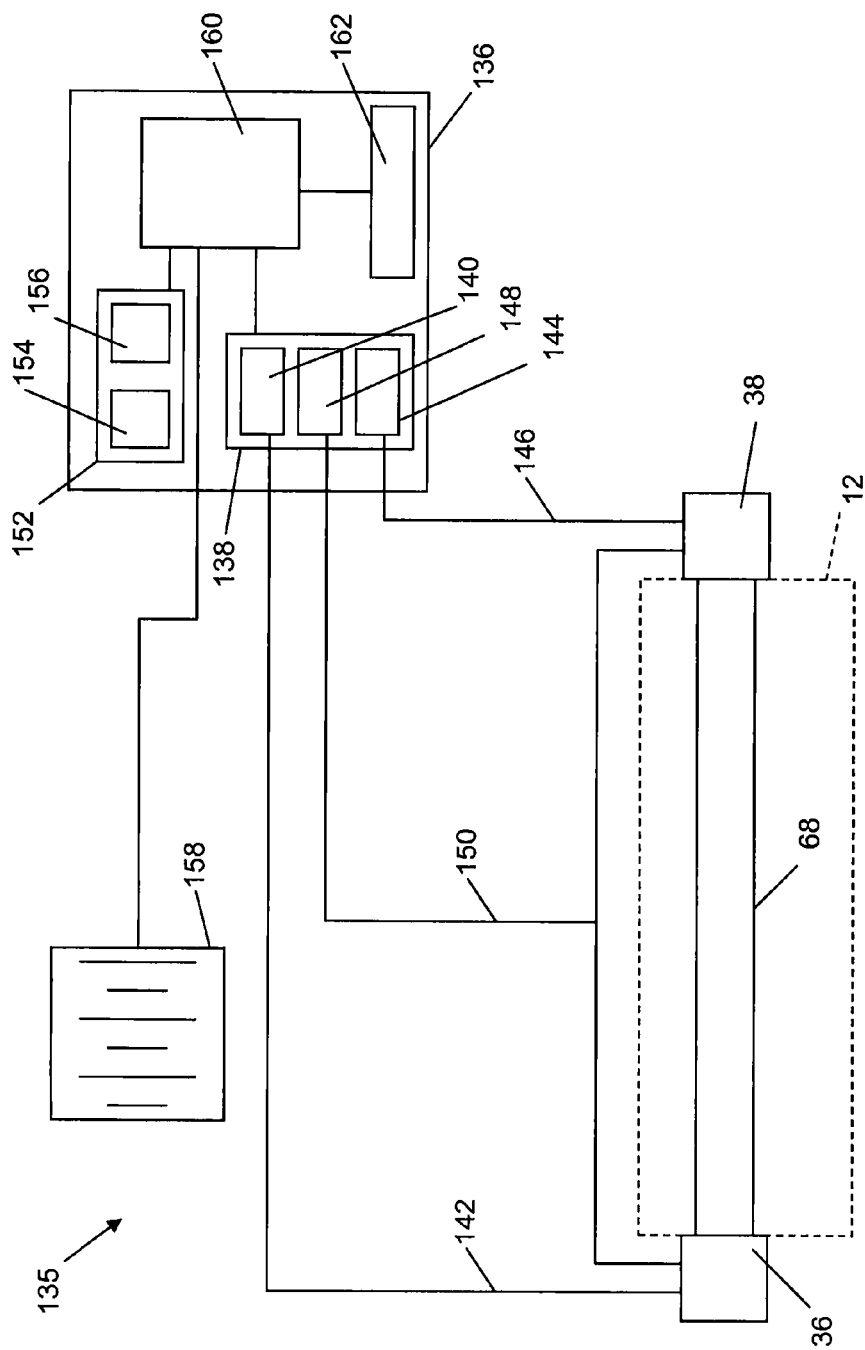
FIG. 6 is a block diagram of exemplary components of a flail mower assembly of the present disclosure.

Referring to FIG. 6, an exemplary control system 135 for controlling operation of the installed one of or both first and second electric motors 36, 38 includes a panel 136 accessible to an operator. Panel 136 includes a motor control switch 138. Motor control switch 138 provides a plurality of switch positions operable to control the installed one of, either one, or both of the electric motors 36, 38. In a first switch position 140, the operator can elect to energize first electric motor 36 through a first motor feed line 142.

In a second switch position 144, the operator can elect to energize second electric motor 38 through a second motor feed line 146. Using a third switch position 148, the operator can elect to simultaneously energize both first and second electric motors 36, 38 using a combined first and second feed line 150. The motor control switch 138 therefore defines a control device operating to select an operating mode of the first and second electric motors 36, 38 including: a first operating mode having only the first electric motor 36 energized; a second operating mode having only the second electric motor 38 energized; and a third operating mode having both the first and second electric motors 36, 38 simultaneously energized. In the third operating mode the first electric motor 36 rotates in a first direction (e.g.: clockwise as viewed from the motor shaft 40) and the second electric motor 38 rotates in a second direction (e.g.: counterclockwise) opposite to the first direction.

According to several embodiments panel 136 can further include a motor rotation control switch 152. Motor rotation control switch 152 can have each of a first and second switch position including a first rotation selection position 154 operable to direct rotation in the first drum rotation direction "A". In a second rotation selection position 156 motor rotation control switch 152 can direct rotation of the flail drum 68 in the second drum rotation direction "B".

Both the first and second electric motors 36, 38 can be further connected to a load 158 such as an energy storage device or battery which can provide the regenerative braking affect previously discussed herein. A controller 160 can also be provided with the panel 136 or independent of panel 136. Controller 160 can be used to control the various functions of control system 135 including direction of rotation of first and second electric motors 36, 38, connection to and/or recharging of load 158, and providing a signal to a flail drum rotation indicator 162 which is provided to visually indicate to the operator the rotating speed of flail drum 68. Controller 160 can also be connected to the load 158 and the installed one of or both the first and second electric motors 36, 38 to direct a current flow to the load 158 and the first and second electric motors 36, 38. Additional indicators (not shown) can also be provided to visually indicate to the operator individual rotational speeds of either or both the first and second electric motors 36, 38. Controller 160 can further provide control to prevent driving one of the operating first or second electric motors 36, 38 by the other of the operating first or second electric motors 36, 38 by controlling a power to each of the first and second electric motors 36, 38. The motor control switch 138 and the motor rotation control switch 152 can also be replaced with digital controls such as digital inputs provided on panel 136.

Figure 7:
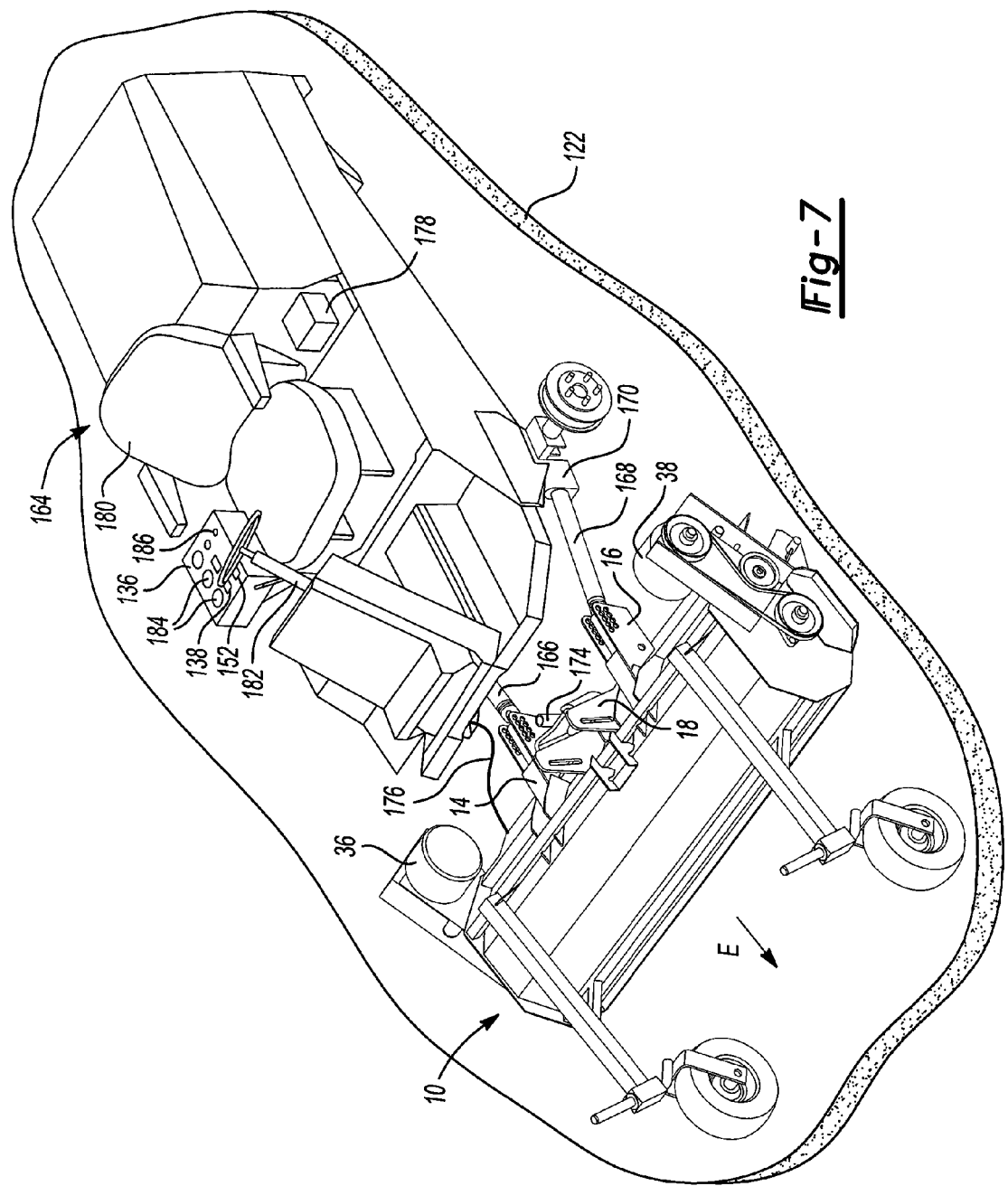
FIG. 7 is a top left perspective view of a tractor configured for operation of a flail mower assembly of FIG. 1.

Referring to FIG. 7, flail mower assembly 10 is shown connected for cutting operation to a power driven machine 164 such as a tractor, mower, or the like which operates in at least the mower travel direction "E" with flail mower assembly 10 in contact with ground surface 122. First and second steering arms 166, 168 are each connected to a connecting assembly 170, 172 (only connecting assembly 172 is visible in this view) and at opposite ends to the first and second sets of connection brackets 14, 16. A lift device 174 connected to support/lift bracket assembly 18 permits raising and lowering of flail mower assembly 10. An electrical wiring harness 176 provides electrical power to operate first and second electric motors 36, 38 from a power source 178 such as a generator or alternator. From an operator's seat 180 an operator of tractor 164 can steer tractor 164 using a steering mechanism 182 using a steering wheel (not shown for visibility of adjacent items). Control panel 136 is accessible to the operator, and in addition to motor control switch 138 and motor rotation control switch 152 can also include one or more gages 184 providing tractor operating conditions and a start/stop control 186.

The use of an electric motor to drive flail mowers of the present disclosure allows the cutting direction of the flail drum to be reversed on-the-fly (in the field by the operator) while mowing. An example of the benefit to reverse directions, for example by pushing a direction control button, is when the operator uses a first or rough cut direction of rotation/cut on taller grass blades to knock down an area of tall grass blades, for example in areas of a golf course not often cut. The operator can then move to a different area requiring a fine cut, reverse the direction of flail drum rotation to the fine cut direction, and fine cut the second area. This process will create either a finished, manicured appearance or a rough cut without requiring the operator/machine to return to a maintenance shop to reconfigure between rough and fine cut rotation directions.

With an electrical drive using the electric motor operated system of the present disclosure, peak cutting or drive power can be delivered when needed without sacrificing efficiency during periods of reduced load. Additionally, an electric drive offers increased flexibility in drive layouts. The drive may consist of one or more electric motors acting in unison to handle peak loads. Alternatively, the potentially high revolutions-per-minute capabilities provided by electric drives allows for smaller, more efficient motors to replace the hydraulic or mechanical drives known in the art. The smaller electric motor can also be further adapted to handle the required load by using a mechanical reduction, a continuously variable transmission, a centrifugal/slipper clutch, or an electrical soft start.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A flail mower assembly comprising:
a deck;
a shaft rotatably connected to the deck;
a flail drum connected to the shaft and co-rotatable with the shaft;
a plurality of flail blade assemblies independently rotatably connected to the flail drum to provide two degrees of freedom-of-rotation of individual ones of the plurality of flail blade assemblies independent of a direction of drum rotation;
a first electric motor connected to the deck and rotatably connected to the shaft, the first electric motor rotating the shaft when energized;
a second electric motor connected to the deck and rotatably connected to the shaft, the second electric motor adapted to rotate the shaft when energized; and
a control device operating to select an operating mode of the first and second electric motors including:
a first operating mode having only the first electric motor energized;
a second operating mode having only the second electric motor energized; and
a third operating mode having both the first and second electric motors simultaneously energized.

2. The flail mower assembly of claim 1, wherein individual ones of the plurality of flail blade assemblies include a flail body bifurcated to create first and second cutting blades.

3. The flail mower assembly of claim 2, wherein each of the first and second cutting blades includes opposed first and second cutting edges.

4. The flail mower assembly of claim 1, wherein individual ones of the plurality of flail blade assemblies comprise:
a mounting plate fixed to the flail drum having first and second mounting shafts extending transversely from the mounting plate;
a flail blade body having an aperture and opposed first and second cutting blades;
a U-shaped shackle having a shackle loop freely disposed through the aperture and first and second looped ends each rotatably connected to one of the first and second mounting shafts.

5. The flail mower assembly of claim 4, wherein:
the first and second looped ends each rotatably connected to one of the first and second mounting shafts create a first one of the two degrees of freedom-of-rotation; and
the shackle loop freely disposed through the aperture creates a second one of the two degrees of freedom-of-rotation.

6. The flail mower assembly of claim 1, wherein in the third operating mode the first electric motor rotates in a first direction and the second electric motor rotates in a second direction opposite to the first direction.

7. The flail mower assembly of claim 1, wherein the plurality of flail blade assemblies is disposed in separate rows each row equidistantly separated from proximate rows.

8. The flail mower assembly of claim 1, comprising a control device operating to select a direction of electric motor rotation to direct rotation of the drum wherein the direction of drum rotation is one of a first direction of rotation and a second direction of rotation opposite to the first direction of rotation.

9. A flail mower assembly comprising:
a deck;
a shaft rotatably connected to the deck;
a flail drum connected to the shaft and co-rotatable with the shaft;
a plurality of flail blade assemblies independently rotatably connected to the flail drum to provide two degrees of freedom-of-rotation of each of the plurality of flail blade assemblies independent of a direction of drum rotation;
first and second electric motors connected to the deck and rotatably connected to the shaft, the shaft rotated by an energized one of the first or second electric motors or both of the first and second electric motors energized simultaneously;
a load connected to the first and second electric motors operating when the first and second electric motors are de-energized to reduce a rotational velocity of the flail drum;
a controller connected to the load and the first and second electric motors operable to direct a current flow to the load and the first and second electric motors; and
an indicator connected to the controller operating to visually indicate a rotational speed of either or both the first and second electric motors.

10. The flail mower assembly of claim 9, wherein the load comprises an energy storage device.

11. The flail mower assembly of claim 9, wherein when energized simultaneously the first electric motor is rotated in a first direction and the second electric motor is rotated in a second direction opposite of the first electric motor.

12. The flail mower assembly of claim 9, further comprising a switch positioned on a panel accessible to an operator operating to energize either or both of the first and second electric motors.

13. The flail mower assembly of claim 9, further comprising a switching device operating to reverse a direction of rotation of an energized one of the first or second electric motors.

14. The flail mower assembly of claim 9, further comprising a switching device operating to reverse a direction of rotation of both the first and second electric motors when simultaneously energized.

15. A flail mower assembly comprising:
a deck;
a shaft rotatably connected to the deck;
a flail drum connected to the shaft and co-rotatable with the shaft;
a plurality of flail blade assemblies independently rotatably connected to the flail drum to provide two degrees of freedom-of-rotation of each of the plurality of flail blade assemblies independent of a direction of drum rotation;
first and second electric motors connected to the deck and rotatably connected to the shaft, the shaft rotated by an energized one of the first or second electric motors or both of the first and second electric motors energized simultaneously;
a drive assembly connecting each of the first and second electric motors to the shaft adapted to vary a rotational speed of energized ones of the first and second electric motors; and
a control device operating to select an operating mode of the first and second electric motors including:
a first operating mode having only the first electric motor energized;
a second operating mode having only the second electric motor energized; and
a third operating mode having both the first and second electric motors simultaneously energized.

16. The flail mower assembly of claim 15, wherein the drive assembly includes:
a drive member connected to a motor shaft;
a driven member connected to the shaft; and
a power transfer device connected between the drive member and the driven member.

17. The flail mower assembly of claim 16, wherein the drive assembly includes a housing connected to the deck and adapted to enclose the drive member, the driven member, and the power transfer device.

18. A power driven machine, comprising:
a power driven machine having a power source operating to propel the power driven machine; and
a flail mower assembly connected to the power driven machine, including:
a deck;
a shaft rotatably connected to the deck;
a flail drum connected to the shaft and co-rotatable with the shaft;
a plurality of flail blade assemblies independently rotatably connected to the flail drum to provide two degrees of freedom-of-rotation of each of the plurality of flail blade assemblies independent of a direction of drum rotation; and
first and second electric motors connected to the deck and rotatably connected to the shaft, the shaft rotated by an energized one of the first or second electric motors or both of the first and second electric motors energized simultaneously.

19. The power driven machine of claim 18, further including a second power source operating to create electrical power to operate the first and second electric motors.

20. The power driven machine of claim 18, further including a control panel mounted on the power driven machine accessible to an operator of the power driven machine and operating permit manual operator control of the flail mower assembly.

21. The power driven machine of claim 18, further including a motor rotation control operating to change rotation of the flail drum between a first rotation direction creating a coarse cut and a second rotation direction creating a fine cut.

22. A mowing machine, comprising:
a power driven mowing machine having a power source operating to propel the power driven machine;
a flail mower assembly connected to the mowing machine, including:
a deck;
a shaft rotatably connected to the deck;
a flail drum connected to the shaft and co-rotatable with the shaft;
a plurality of flail blade assemblies independently rotatably connected to the flail drum to provide two degrees of freedom-of-rotation of each of the plurality of flail blade assemblies independent of a direction of drum rotation; and
first and second electric motors connected to the deck and rotatably connected to the shaft, the shaft rotated by an energized one of the first or second electric motors or both of the first and second electric motors energized simultaneously; and a controller in communication with first and second electric motors operating to direct power to the first and second electric motors.

23. The mowing machine of claim 22, wherein the controller further operates to identify an operating speed of the first and second electric motors.

24. The mowing machine of claim 22, wherein the controller further operates to control a direction of rotation of the first and second electric motors.

25. The mowing machine of claim 22, further including a control system including a motor control switch having a first position operating to energize the first electric motor, a second position operating to energize the second electric motor, and a third position operating to energize both the first and second electric motors.

26. The mowing machine of claim 22, further including a load, wherein the controller further operates to direct a current flow between the load and the first and second electric motors.

* * * * *